(No Model.)

F. W. SCHARRATH.
COOKING VESSEL.

No. 246,691. Patented Sept. 6, 1881.

WITNESSES:
Carl Karp
Otto Risch

INVENTOR
Friedrich Wilhelm Scharrath
BY Paul Goepel
ATTORNEY

N. PETERS, Photo-Lithographer, Washington, D. C.

UNITED STATES PATENT OFFICE.

FRIEDRICH W. SCHARRATH, OF BERLIN, GERMANY, ASSIGNOR TO HIMSELF, AND MORIZ VON ZYKA-RADVÁNSZKY AND GUSTAF LIEDMAN, BOTH OF SAME PLACE.

COOKING-VESSEL.

SPECIFICATION forming part of Letters Patent No. 246,691, dated September 6, 1881.

Application filed May 16, 1881. (No model.)

*To all whom it may concern:*

Be it known that I, FRIEDRICH WILHELM SCHARRATH, of the city of Berlin, in the Kingdom of Prussia and Empire of Germany, have invented certain new and useful Improvements in Cooking-Vessels, of which the following is a specification.

This invention relates to an improved cooking apparatus in which meat, vegetables, &c., can be cooked at the same time, either on a stove or on the open fire, or by a petroleum or alcohol lamp, the vessel being especially adapted for military and camping purposes.

The invention consists in a main vessel having an interior perforated partition-plate, a removable upper vessel closed by a tightly-fitting cover which also closes the main vessel, and of a locking device operated by an eccentrically-pivoted bail and by rods which are pivoted to the sides of the main vessel. The interior vessel has a central bottom opening or tube, which may be closed by a cork or left open, as desired.

Figure 1:
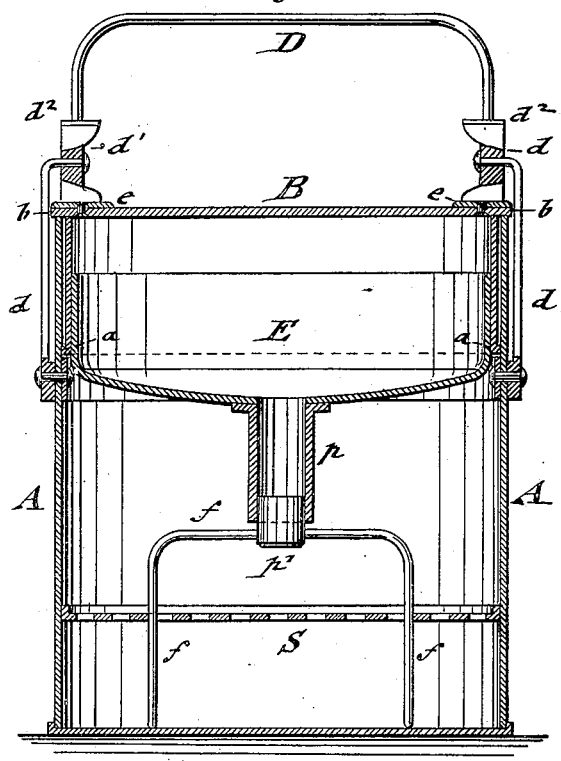
Figure 2:
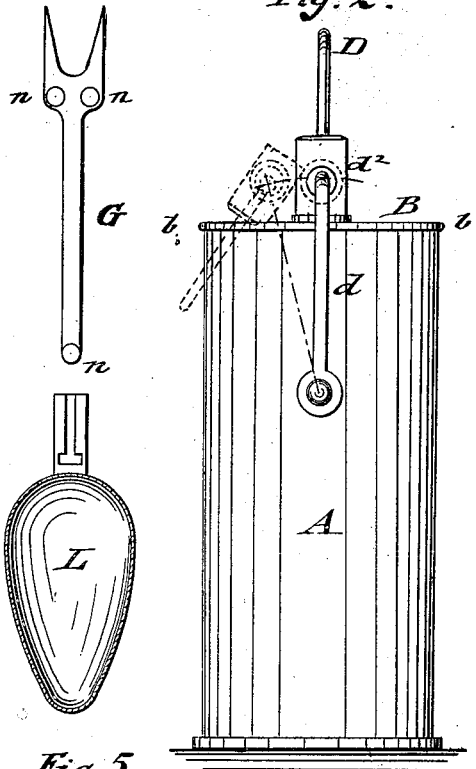
Figure 5:
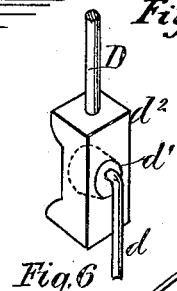
Figure 3:
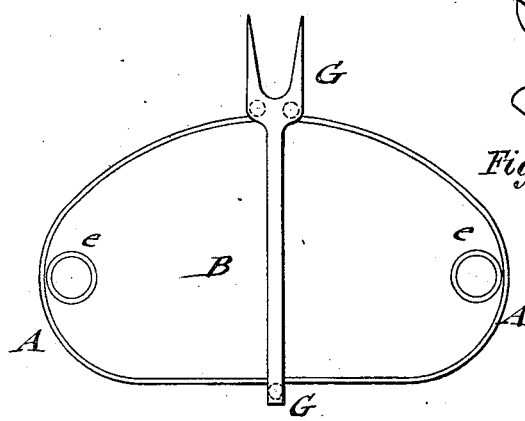
Figure 4:
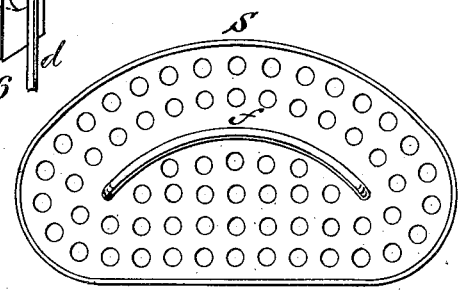

In the accompanying drawings, Figure 1 represents a vertical longitudinal section of my improved cooking-vessel. Fig. 2 is a side view of the same; Fig. 3, a top view, showing a specially-constructed fork applied to the cover for removing the same. Fig. 4 is a detail top view of the interior perforated plate; and Fig. 5, a detail view of the spoon and fork to be used with the vessel. Fig. 6 is a perspective detail of one of the blocks and eccentrics for fastening the cover.

Similar letters of reference indicate corresponding parts.

Referring to the drawings, A represents the main vessel, which may be made of any suitable size and shape, that shown in the drawings being of oval shape and flattened at one side, so as to be readily carried when used for military or camping purposes. At the lower part of the main vessel A is arranged a horizontal perforated partition-plate, S, which is supported upon a fixed wire frame, $f$, as shown clearly in Figs. 1 and 4.

B represents the cover of the main vessel, and E an interior vessel with concave bottom extension-tube $p$, which may be closed by a stopper, $p'$. The cover B is tightly fitted to the inner vessel, E, and has an outwardly-projecting flange or shoulder, $a$, at its lower edge, which fits tightly into the main vessel A, while the rimmed upper edge, $b$, of the cover rests upon the top edge of the main vessel A. The cover B may be forced more or less over the inner vessel, E, so as to form therewith a smaller or larger inclosed space. The inner vessel, E, is, according to its adjustment within the cover, in a higher or lower position within the main vessel, and supported in its position by the upper projecting rim, $b$, of the cover B. The cover B is firmly locked at diametrically-opposite points to the vessel A by means of rods $d$, the lower ends of which are pivoted to the sides of the main vessel A and bent inwardly at their upper ends, passing through the conical eccentrics $d'\ d'$, to which they are fastened. The end blocks, $d^2\ d^2$, of the bail D turn upon the eccentrics, which form, with the bail D, a sort of toggle-lever arrangement. The lower ends of the blocks $d^2$ of the bail D are arranged tightly upon the raised disk-shaped seats $e$ of the cover B by swinging the bail in upward direction, and, finally, rigidly to the cover, by bringing the bail and the side rods in line with each other, as shown in Fig. 2, said blocks and bail being rigidly fastened together. In this manner the cover B is firmly locked at two opposite points by the locking device described, so as to retain the cover against displacement by the interior steam-pressure, but without inducing any danger of explosion, as any surplus steam will escape in the usual manner through a safety-valve, with which the vessel is designed to be provided.

The apparatus is used as follows: The interior space of the main vessel A is filled with water until the same covers the perforated plate S. The potatoes or other vegetables to be cooked are placed into the space above the perforated plate. The meat or other article to be cooked is put into the inner vessel, E, which is then closed by the cover B, and the latter finally locked to the main vessel by swinging up the bail and setting it into vertical position by the eccentric bearings of the side rods. In this condition the vessel is placed on the fire, which will soon change the water in the vessel into steam, which passes through the vegetables and then either into the inner vessel, E, when the bottom tube of the same is open, or around the same when the same is closed, so as to cook the contents of the main vessel A, as well as those of the vessel E, without admitting any escape of vapors.

The apparatus can be used for cooking coffee or tea in the main vessel A or in the inner vessel, E, without any loss of aroma. The cover, as well as the vessel E, may be used as drinking-vessels, if desired.

In combination with the cooking-vessel are used the fork G and the spoon L, which may be connected to and detached from each other in a suitable manner, the fork being provided with lugs $n$ at both ends, by which, also, the cover B may be taken hold of at its upper edges and lifted out of the main vessel.

If, for some reason or other, any sudden interruption in cooking should be necessary, the entire cooking-vessel may be bodily removed from the fire with its contents and carried without any loss of the same, as the bail retains the cover in closed position. The contents can also be cooked during transportation by arranging a lamp or other heating device below the vessel and surrounding the whole with a wire-gauze guard.

Having thus described my invention, I claim as new and desire to secure by Letters Patent—

1. In a cooking-vessel, the combination of an interior vessel, E, having a bottom extension-tube, $p$, with an inclosing-cover, B, that is fitted intermediately between the outer vessel, A, and inner vessel, E, so as to support the latter in higher or lower position, substantially as set forth.

2. The combination of the main vessel A, interior vessel, E, and cover B with pivoted side rods, $d\ d$, eccentric bearings $d'\ d'$, and bail D, having end blocks, $d^2$, to lock the cover in position, substantially as set forth.

3. The combination of the main vessel A, having a perforated partition-plate, S, supported by a wire stand, $f$, with a steaming-vessel, E, having tubular bottom-extension $p$, and with a cover, B, which fits around the vessel E and inside of the main vessel A, substantially as and for the purpose set forth.

This specification signed by me this 23d day of March, 1881.

FRIEDRICH WILHELM SCHARRATH.

Witnesses:
OSCAR STEIN,
FRANK C. ZIMMERMAN.